US012568035B2

(12) United States Patent
Ma et al.

(10) Patent No.: US 12,568,035 B2
(45) Date of Patent: Mar. 3, 2026

(54) METHOD FOR FORWARDING SERVICE PACKET, METHOD FOR SENDING SR POLICY, DEVICE, AND SYSTEM

(71) Applicant: HUAWEI TECHNOLOGIES CO., LTD., Guangdong (CN)

(72) Inventors: Linlin Ma, Beijing (CN); Guoqi Xu, Beijing (CN); Zhibo Hu, Beijing (CN); Ka Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 413 days.

(21) Appl. No.: 18/183,780

(22) Filed: Mar. 14, 2023

(65) Prior Publication Data

US 2023/0216786 A1      Jul. 6, 2023

Related U.S. Application Data

(63) Continuation of application No. PCT/CN2021/118411, filed on Sep. 15, 2021.

(30) Foreign Application Priority Data

Sep. 15, 2020   (CN) ......................... 202010970269.8

(51) Int. Cl.
　　*H04L 12/00*　　　(2006.01)
　　*H04L 45/00*　　　(2022.01)
　　*H04L 41/0894*　　(2022.01)
(52) U.S. Cl.
　　CPC .............. *H04L 45/00* (2013.01); *H04L 45/34* (2013.01); *H04L 41/0894* (2022.05)
(58) Field of Classification Search
　　CPC ..... H04L 45/00; H04L 45/34; H04L 41/0894; H04L 47/80; H04L 41/0893; H04L 45/50; H04L 45/74; H04L 45/741

(Continued)

(56) References Cited

U.S. PATENT DOCUMENTS 7,801,149 B1 *   9/2010   France ................... H04L 45/50
　　　　　　　　　　　　　　　　　　　　370/466
9,832,099 B1 *   11/2017  Traina ..................... H04L 45/02
　　　　　　　　　　(Continued)

FOREIGN PATENT DOCUMENTS

CN　　107517488 A　　12/2017
CN　　108023761 A　　5/2018
　　　　　　　(Continued)

OTHER PUBLICATIONS

Filsfils et al., Cisco Systems C et al: "Segment Routing Policy for Traffic Engineering draft-filsfils-spring-segment-routing-policy-05. txt; draft-filsfilsspring-segment-routing-policy-05. txt", No. 5 Mar. 1, 2018 (Mar. 1, 2018), pp. 1-50, XP015154916.

(Continued)

*Primary Examiner* — Frantz Coby
(74) *Attorney, Agent, or Firm* — WOMBLE BOND DICKINSON (US) LLP

(57) ABSTRACT

This application provides a method for forwarding a service packet, a method for sending an SR policy, a device, and a system, and belongs to the field of network technologies. In the solution provided in this application, a network device may forward, according to a first candidate path in an SR policy through a sub-interface corresponding to a first network slice, a service packet, and the first candidate path and a first identifier of a first network slice corresponding to the first candidate path are encapsulated in the service packet.

12 Claims, 10 Drawing Sheets

(58) Field of Classification Search
USPC ........................................................ 370/389
See application file for complete search history.

(56) References Cited

U.S. PATENT DOCUMENTS

| | | | | |
|---|---|---|---|---|
| 10,356,007 | B2 * | 7/2019 | Chou ...................... | H04L 12/64 |
| 10,389,594 | B2 * | 8/2019 | Yedavalli ................ | H04L 47/00 |
| 10,601,724 | B1 | 3/2020 | Filsfils et al. | |
| 11,329,916 | B2 * | 5/2022 | MeLampy .............. | H04L 45/74 |
| 11,424,986 | B2 * | 8/2022 | Filsfils ................... | H04L 45/50 |
| 11,456,955 | B2 * | 9/2022 | Menon .................. | H04L 45/566 |
| 11,502,954 | B1 * | 11/2022 | Gadela .................. | H04L 45/741 |
| 11,799,778 | B1 * | 10/2023 | Gadela .................... | H04L 45/74 |
| 2015/0200847 | A1 * | 7/2015 | Gourlay .................. | H04L 47/80 |
| | | | | 370/392 |
| 2018/0375764 | A1 * | 12/2018 | Filsfils ................... | H04L 45/50 |
| 2018/0375968 | A1 * | 12/2018 | Bashandy ............... | H04L 45/34 |
| 2021/0385163 | A1 * | 12/2021 | Gao ........................ | H04L 45/42 |
| 2022/0014460 | A1 * | 1/2022 | Filsfils ................... | H04L 45/52 |
| 2022/0124033 | A1 * | 4/2022 | He .......................... | H04L 45/74 |
| 2022/0385573 | A1 * | 12/2022 | Filsfils ................... | H04L 45/50 |
| 2023/0275829 | A1 * | 8/2023 | Hu .......................... | H04L 45/02 |
| | | | | 709/245 |
| 2023/0370358 | A1 * | 11/2023 | Song ....................... | H04L 45/50 |
| 2024/0022501 | A1 * | 1/2024 | Wang ...................... | H04L 67/34 |
| 2024/0106727 | A1 * | 3/2024 | Peng ....................... | H04L 43/08 |
| 2025/0047597 | A1 * | 2/2025 | Huang ............... | H04L 41/0895 |
| 2025/0175417 | A1 * | 5/2025 | Zhang .................... | H04L 45/04 |

FOREIGN PATENT DOCUMENTS

| | | |
|---|---|---|
| CN | 110233765 A | 9/2019 |
| CN | 110535766 A | 12/2019 |
| CN | 110535782 A | 12/2019 |
| CN | 111107004 A | 5/2020 |
| CN | 111385207 A | 7/2020 |
| WO | 2016115850 A1 | 7/2016 |
| WO | 2020164473 A1 | 8/2020 |

OTHER PUBLICATIONS

Shaofu Peng et al., ZTE Corporation Fengwei Qin China Mobile: "Packet Network Slicing using Segment Routing; draft-peng-teas-network-slicing-03.txt", No. 3 Feb. 19, 2020 (Feb. 19, 2020), pp. 1-26, XP015137811.

Zhu Lin, Research on IP RAN enhanced techonology for 5G bearer netw orks, May 2020, 6 pages.

M. Koldychev, PCEP extension to support Segment Routing Policy Candidate Paths; draft-barth-pce-segment-routing-policy-cp-06, Jun. 2, 2020, 39 pages.

Y. Wang, BGP Extension for Advertising In-situ Flow Information Telemetry (IFIT) Capabilities; draft-wang-idr-bgp-ifit-capabilities-00, Jul. 14, 2020, 19 pages.

Shi Hongwei, Research on Network Slicing Technology Based on SRv6, Aug. 2020, 5 pages.

S. Previdi, Advertising Segment Routing Policies in BGP; draft-ietf-idr-segment-routing-te-policy-09, May 28, 2020, 76 pages.

K. Raza, Ed., Yang Data Model for Segment Routing Policy; draft-raza-spring-sr-policy-yang-03.txt, Jul. 13, 2020, 93 pages.

* cited by examiner

```
segment-routing (segment routing)
    traffic-engineering (traffic engineering)
        + attributes (attributes)
        |       +affinity-map (affinity map)
        |       |    ...
        |       |
        |       + segment-lists (segment list)
        |       |    segment-list* [name] (segment list name)
        |       |        segments (segment)
        |       |            segment* [index] (segment index)
        |       |                ...
        |       + explicit-binding-sid-rules (explicit binding segment identifier rule)
        |           ...
        |
        + policies (policy)
            policy* [color endpoint] (color endpoint)
                + ...
                |
                + binding-sid (binding segment identifier)
                | ...
                |
                + candidate-paths (candidate path)
                    candidate-path* [protocol-origin originator discriminator] (protocol-origin
originator discriminator)
                        + ...
                        +slice-ID (slice identifier)
    Newly       + type (type)
 added node         + explicit (explicit)
                    |    segment-lists (segment list)
                    |        segment-list* [ref] (segment list reference)
                    |            ...
                    + dynamic (dynamic)
                        Constraints (constraint)
```

FIG. 5

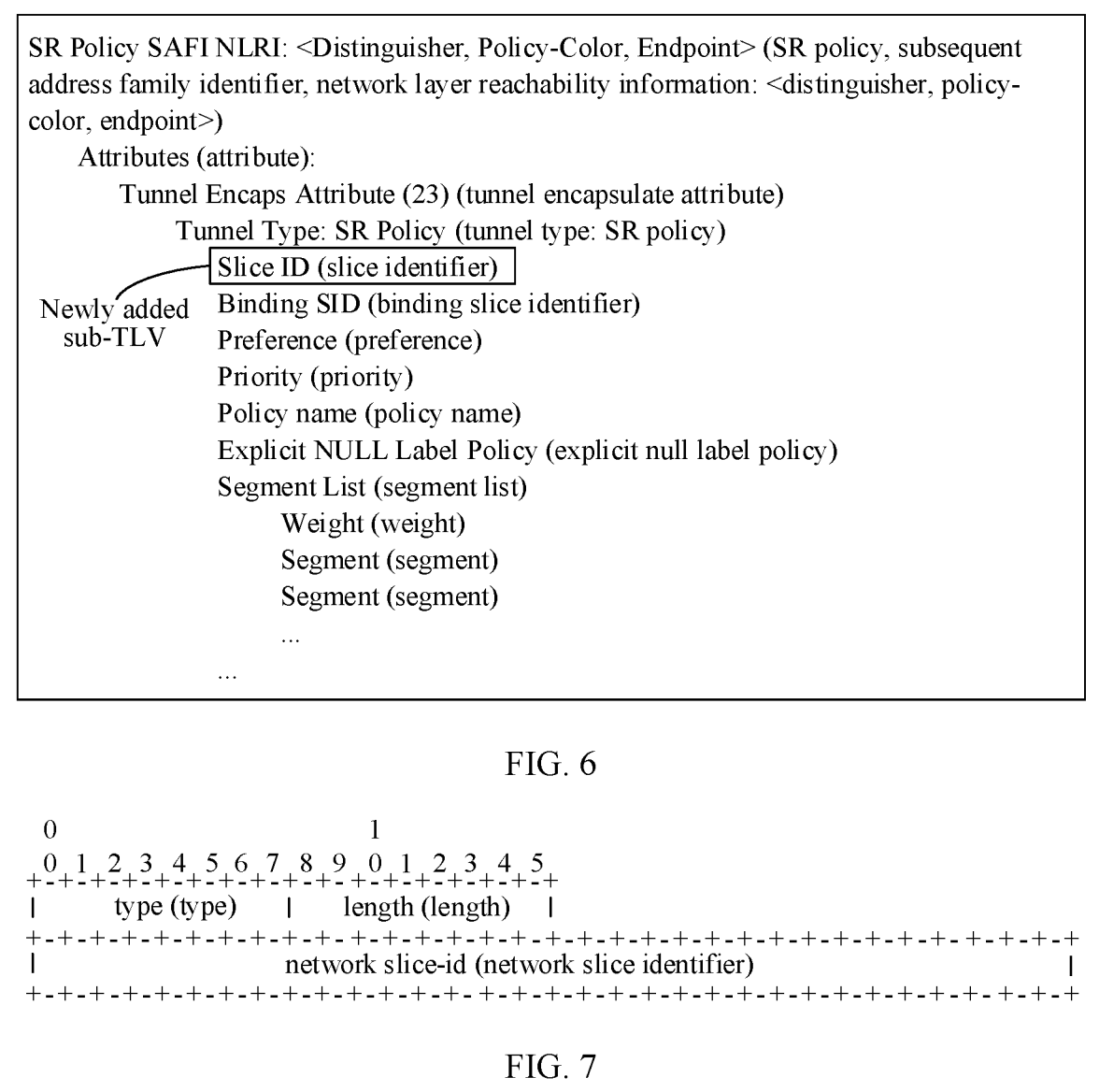

SR Policy SAFI NLRI: <Distinguisher, Policy-Color, Endpoint> (SR policy, subsequent address family identifier, network layer reachability information: <distinguisher, policy-color, endpoint>)

Attributes (attribute):

Tunnel Encaps Attribute (23) (tunnel encapsulate attribute)

Tunnel Type: SR Policy (tunnel type: SR policy)

| Slice ID (slice identifier) |

Newly added sub-TLV     Binding SID (binding slice identifier)

Preference (preference)

Priority (priority)

Policy name (policy name)

Explicit NULL Label Policy (explicit null label policy)

Segment List (segment list)

Weight (weight)

Segment (segment)

Segment (segment)

```
 0                               1
 0 1 2 3 4 5 6 7 8 9 0 1 2 3 4 5
+-+-+-+-+-+-+-+-+-+-+-+-+-+-+-+-+
|      type (type)    |    length (length)    |
+-+-+-+-+-+-+-+-+-+-+-+-+-+-+-+-+-+-+-+-+-+-+-+-+-+-+-+-+-+-+-+
|            network slice-id (network slice identifier)            |
+-+-+-+-+-+-+-+-+-+-+-+-+-+-+-+-+-+-+-+-+-+-+-+-+-+-+-+-+-+-+-+
```

FIG. 7

Color (color): 123
EndPoint (endpoint): 2001:db8::1
Binding SID (binding slice identifier): 1::b100
Preference (preference): 100
Slice ID (slice identifier): 1
Candidate path (candidate path)
Segment List 1 (segment list 1)
<C, E, B>
Preference (preference): 50
Slice ID (slice identifier): 2
Candidate path (candidate path)
Segment List 2 (segment list 2):
<D, F, B>

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     type (type)     |    length (length)   |     Attribute information      |
+-+-+-+-+-+-+-+-+-+-+-+-+-+-+-+-+-+-+-+-+-+-+-+-+-+-+-+-+-+-+-+-+
```

FIG. 9

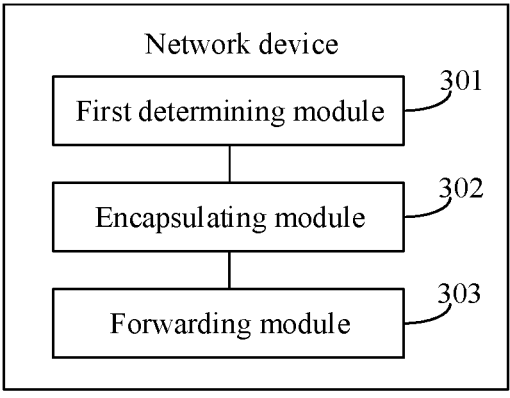

FIG. 10

METHOD FOR FORWARDING SERVICE PACKET, METHOD FOR SENDING SR POLICY, DEVICE, AND SYSTEM

This application is a continuation of International Application No. PCT/CN2021/118411, filed on Sep. 15, 2021, which claims priority to Chinese Patent Application No. 202010970269.8, filed on Sep. 15, 2020. The disclosures of the aforementioned applications are hereby incorporated by reference in their entireties.

TECHNICAL FIELD

This application relates to the field of network technologies, and in particular, to a method for forwarding a service packet, a method for sending an SR policy, a device, and a system.

BACKGROUND

A network slice is a logical network that is virtualized from a physical network and can meet a specific service level agreement (SLA) requirement. The network slice may also be referred to as a virtual network, or a network fragment. A plurality of network slices that are mutually isolated are obtained by dividing the physical network, so that service packets having different SLA requirements may be carried in different network slices for transmission, to meet requirements in different application scenarios.

An SR policy in segment routing traffic engineering (SR-TE) provides a flexible forwarding path selection method. The SR policy may include at least one candidate path identified by a segment list. When the service packet is forwarded according to the SR policy, a candidate path with a highest preference may be selected from the at least one candidate path for forwarding.

In the related technology, after a network supporting the SR policy is sliced, the service packet is forwarded in the network slice, which is independent of forwarding of the service packet through the SR policy, and flexibility of service packet forwarding is poor.

SUMMARY

This application provides a method for forwarding a service packet, a method for sending an SR policy, a device, and a system, to resolve a technical problem that flexibility of service packet forwarding is poor in the related technology.

According to a first aspect, a method for forwarding a service packet is provided, and is applied to a network device. The method may include: determining a segment routing SR policy corresponding to a received service packet, where the SR policy includes a first candidate path and a first identifier of a first network slice corresponding to the first candidate path, and the network device is a head-end network device of the first candidate path; encapsulating the first candidate path and the first identifier of the first network slice in the service packet; and forwarding, according to the first candidate path through a sub-interface corresponding to the first network slice in the network device, the service packet in which the first candidate path and the first identifier are encapsulated, where the sub-interface is obtained by dividing a physical outbound interface of the network device.

According to the method provided in this application, it may be ensured that the network device that receives the service packet can forward the service packet through the sub-interface corresponding to the first network slice according to the first candidate path in a corresponding SR policy. Because the first network slice corresponds to the first candidate path, a network slice technology and an SR policy are combined, which effectively improves flexibility of forwarding the service packet.

In some embodiments, the SR policy further includes a second candidate path and a second identifier of a second network slice corresponding to the second candidate path, and a preference of the first candidate path is higher than a preference of the second candidate path. After the network device determines the SR policy corresponding to the received service packet, the method further includes: determining that there is no sub-interface corresponding to the first network slice in the network device, or the sub-interface corresponding to the first network slice is faulty; encapsulating the second candidate path and the second identifier of the second network slice corresponding to the second candidate path in the service packet; and forwarding, according to the second candidate path through a sub-interface corresponding to the second network slice in the network device, the service packet in which the second candidate path and the second identifier are encapsulated.

The second network slice and the first network slice may be divided based on a same service requirement, so that it may be ensured that an SLA requirement of a service may still be met after the network device forwards the service packet through the sub-interface corresponding to the second network slice.

In some embodiments, the SR policy further includes attribute information of the first network slice. A process of encapsulating the second candidate path and the second identifier of the second network slice corresponding to the second candidate path in the service packet includes: if the attribute information indicates forced forwarding, encapsulating the second candidate path and the second identifier of the second network slice corresponding to the second candidate path in the service packet. The method for forwarding a service packet further includes: if the attribute information indicates non-forced forwarding, forwarding, according to the first candidate path through the physical outbound interface of the network device, the service packet in which the first candidate path and the first identifier are encapsulated.

In the solution provided in this application, the network device may further select, based on an indication of the attribute information in the SR policy, to forward the service packet from the physical outbound interface of the network device, or to forward the service packet according to the second candidate path in the SR policy, so that resources of the network slice may be properly used based on a requirement, to improve flexibility of forwarding the service packet.

In some embodiments, before the network device determines the SR policy corresponding to the received service packet, the network device may further receive the SR policy sent by a control device. In other words, the SR policy is generated by the control device and delivered to the network device.

In some embodiments, a process of receiving the SR policy sent by the control device may include: receiving the SR policy sent by the control device through a network configuration protocol (NETCONF); receiving the SR policy sent by the control device through a border gateway protocol (BGP); or receiving the SR policy sent by the control device through a path computation element communication protocol (PCEP).

In the solution provided in this application, the control device may send the SR policy through a plurality of methods, to improve flexibility of deploying the SR policy.

In some embodiments, a process in which the network device encapsulates the first candidate path and the first identifier in the service packet may include: encapsulating the first candidate path in a packet header of the service packet; and encapsulating the first identifier in a payload of the service packet.

The network device may encapsulate a label stack of a segment list or a segment routing header (SRH) in the packet header, and the SRH may carry a segment list used for identifying the first candidate path. In addition, the network device may encapsulate a hop-by-hop header in the payload of the service packet, and the hop-by-hop header carries the first identifier of the first network slice.

According to a second aspect, a method for forwarding a service packet is provided. The method may be applied to a network device, and the method may include: receiving a service packet, where a first candidate path and a first identifier of a first network slice corresponding to the first candidate path are encapsulated in the service packet; and forwarding, according to the first candidate path through a sub-interface corresponding to the first network slice in the network device, the service packet in which the first candidate path and the first identifier are encapsulated, where the network device is a network device other than a head-end network device and a tail-end network device in the first candidate path, and the sub-interface is obtained by dividing a physical outbound interface of the network device.

According to a third aspect, a method for sending an SR policy is provided. The method may be applied to a control device, and the method includes: generating an SR policy, where the SR policy includes a first candidate path and a first identifier of a first network slice corresponding to the first candidate path; and sending the SR policy to a network device, where the network device is a head-end network device of the first candidate path, and the SR policy indicates to encapsulate the first candidate path and the first identifier in a service packet corresponding to the SR policy.

In some embodiments, the SR policy further includes: a second candidate path, a second identifier of a second network slice corresponding to the second candidate path, a preference of the first candidate path, and a preference of the second candidate path.

In some embodiments, a process in which the control device sends the SR policy to the network device may include: sending the SR policy to the network device through a NETCONF; sending the SR policy to the network device through a BGP; or sending the SR policy to the network device through a PCEP.

According to a fourth aspect, a network device is provided. The network device includes at least one module, and the at least one module may be configured to implement the method for forwarding a service packet provided in the first aspect.

According to a fifth aspect, a network device is provided. The network device includes at least one module, and the at least one module may be configured to implement the method for forwarding a service packet provided in the second aspect.

According to a sixth aspect, a control device is provided. The control device includes at least one module, and the at least one module may be configured to implement the method for sending an SR policy provided in the third aspect.

According to a seventh aspect, a network device is provided. The network device includes: a memory, a processor, and a computer program that is stored in the memory and that can be run on the processor. When executing the computer program, the processor implements the method for forwarding a service packet provided in the first aspect.

According to an eighth aspect, a network device is provided. The network device includes: a memory, a processor, and a computer program that is stored in the memory and that can be run on the processor. When executing the computer program, the processor implements the method for forwarding a service packet provided in the second aspect.

According to a ninth aspect, a control device is provided. The control device includes: a memory, a processor, and a computer program that is stored in the memory and that can be run on the processor. When executing the computer program, the processor implements the method for sending an SR policy provided in the third aspect.

According to a tenth aspect, a network device is provided. The network device may include: a main control board and an interface board, and the main control board and/or the interface board may be configured to implement the method for forwarding a service packet provided in the first aspect or the second aspect.

According to an eleventh aspect, a network device is provided. The network device includes a main control board and an interface board. The main control board includes: a first processor and a first memory. The interface board includes: a second processor, a second memory, and an interface card. The main control board and the interface board are coupled. The first memory may be configured to store first program code, and the second memory may be configured to store second program code. The first program code and/or the second program code are/is used for being invoked by a processor to implement the following operations: determining a segment routing SR policy corresponding to a received service packet, where the SR policy includes a first candidate path and a first identifier of a first network slice corresponding to the first candidate path, and the network device is a head-end network device of the first candidate path; encapsulating the first candidate path and the first identifier of the first network slice in the service packet; and forwarding, according to the first candidate path through a sub-interface corresponding to the first network slice in the network device, the service packet in which the first candidate path and the first identifier are encapsulated, where the sub-interface is obtained by dividing a physical outbound interface of the network device.

According to a twelfth aspect, a network device is provided. The network device includes a main control board and an interface board. The main control board includes: a first processor and a first memory. The interface board includes: a second processor, a second memory, and an interface card. The main control board and the interface board are coupled. The first memory may be configured to store first program code, and the second memory may be configured to store second program code. The first program code and/or the second program code are/is used for being invoked by a processor to implement the following operations: receiving a service packet, where a first candidate path and a first identifier of a first network slice corresponding to the first candidate path are encapsulated in the service packet; and forwarding, according to the first candidate path through a sub-interface corresponding to the first network slice in the network device, the service packet in which the first candidate path and the first identifier are encapsulated, where the network device is a network device other than a head-end network device and a tail-end network device in the first candidate path, and the sub-interface is obtained by dividing a physical outbound interface of the network device.

According to a thirteenth aspect, a computer-readable storage medium is provided. The computer-readable storage medium stores instructions. When the instructions are run on the computer, the computer is enabled to perform the method for forwarding a service packet provided in the first aspect or the second aspect, or perform the method for sending an SR policy provided in the third aspect.

According to a fourteenth aspect, a computer program product including instructions is provided. When the computer program product is run on a computer, the computer is enabled to perform the method for forwarding a service packet provided in the first aspect or the second aspect, or perform the method for sending an SR policy provided in the third aspect.

According to a fifteenth aspect, a system for forwarding a service packet is provided. The system may include the network device provided in the fourth aspect, the seventh aspect, or the eleventh aspect, the network device provided in the fifth aspect, the eighth aspect, or the twelfth aspect, and the control device provided in the sixth aspect or the ninth aspect.

In summary, this application provides a method for forwarding a service packet, a method for sending an SR policy, a device, and a system. In the solution provided in this application, a network device may forward a service packet according to a first candidate path in an SR policy through a sub-interface corresponding to a first network slice, and the first candidate path and a first identifier of a first network slice corresponding to the first candidate path are encapsulated in the service packet. In this way, it may be ensured that the network device that receives the service packet can also continue to forward the service packet according to the first candidate path through the sub-interface corresponding to the first network slice. In this way, a network slice technology and the SR policy are combined, which effectively improves flexibility of forwarding the service packet.

BRIEF DESCRIPTION OF DRAWINGS

FIG. 5 is a diagram of an encoding structure of an extended SR policy according to an embodiment of this application;

FIG. 6 is a diagram of an encoding structure of another extended SR policy according to an embodiment of this application;

FIG. 7 is a diagram of a field used for carrying an identifier of a network slice according to an embodiment of this application;

FIG. 8 is a diagram of an SR policy according to an embodiment of this application;

6

Figure 11:
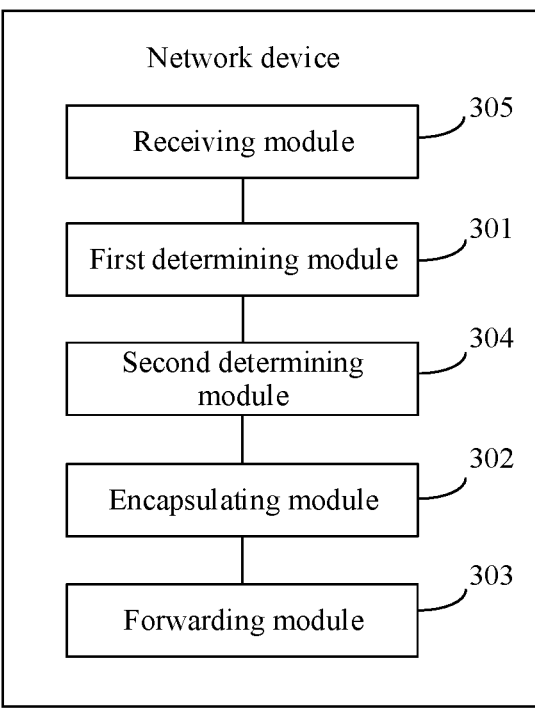
Figure 12:
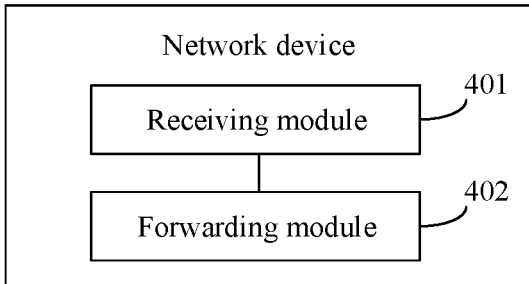
Figure 13:
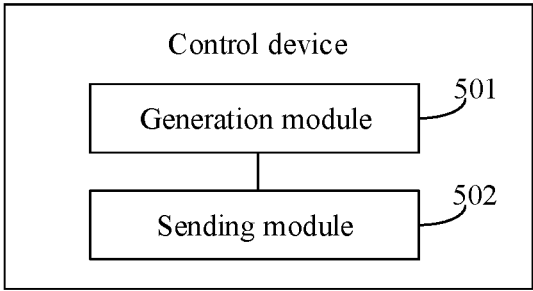
Figures 14, 15:
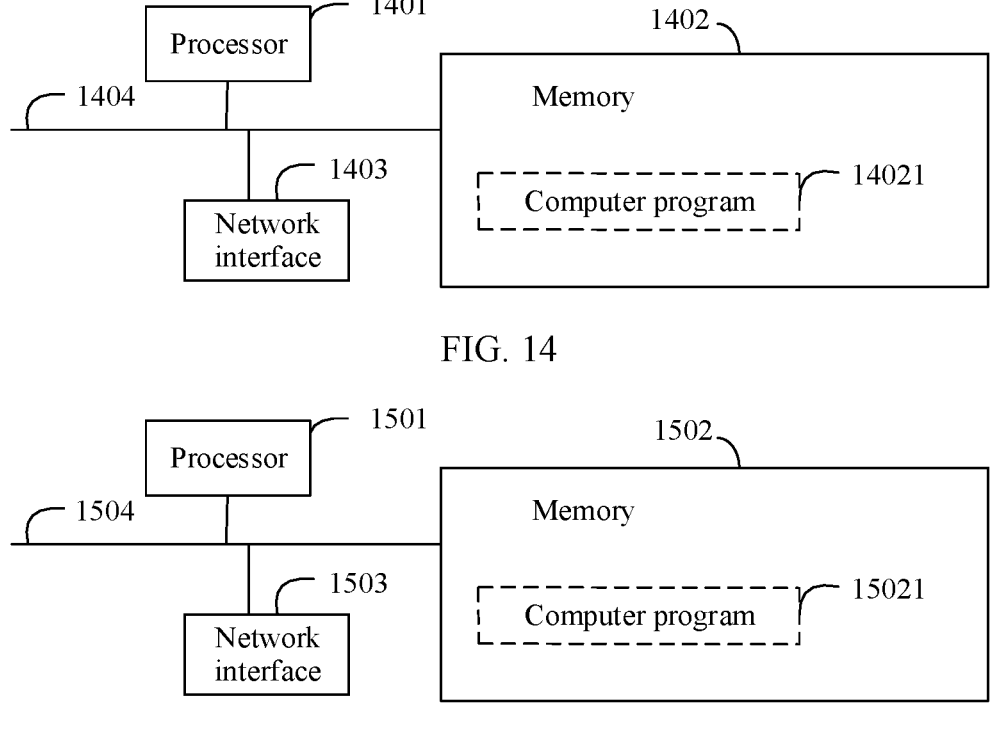
Figure 16:
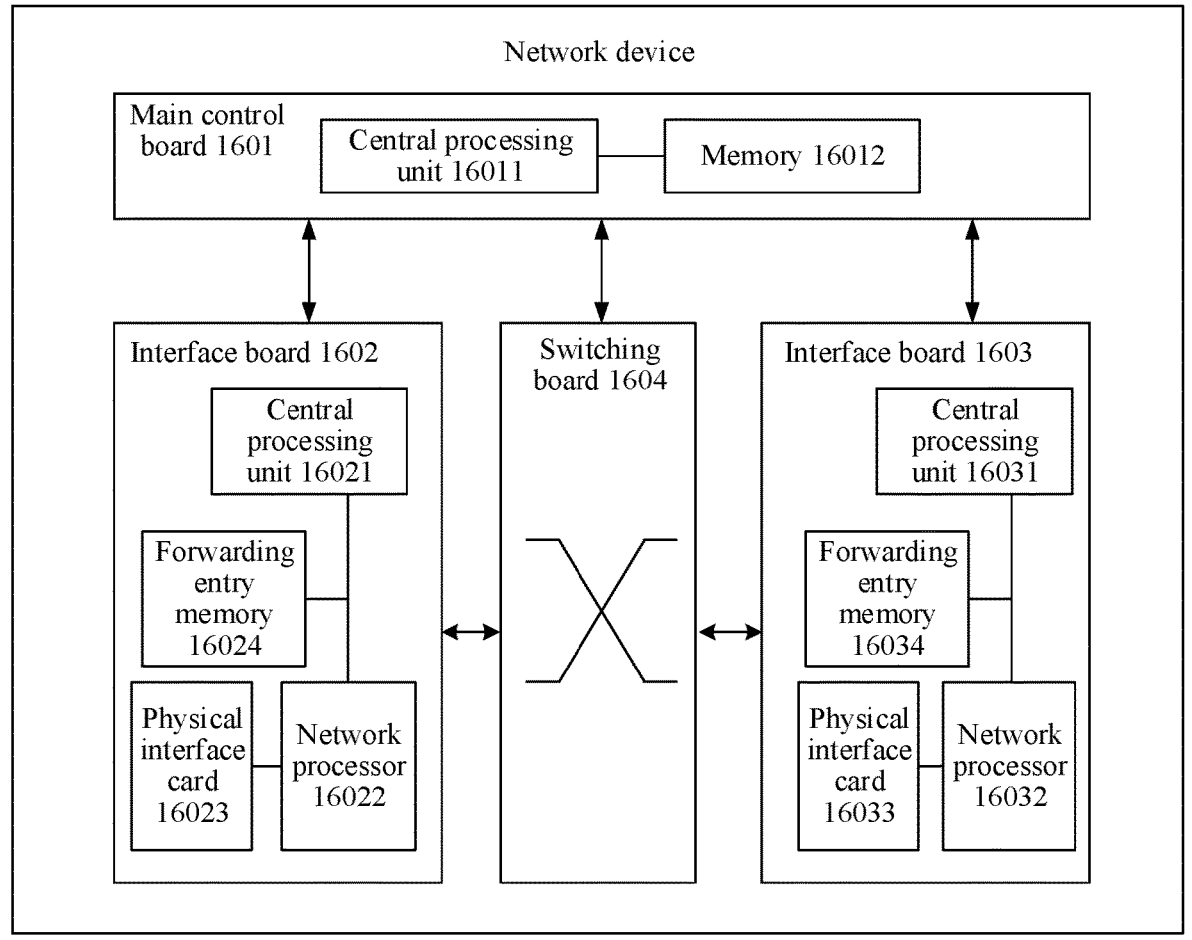

FIG. 9 is a diagram of a field used for carrying attribute information of a network slice according to an embodiment of this application;

FIG. 10 is a diagram of a network device according to an embodiment of this application;

FIG. 11 is a diagram of another network device according to an embodiment of this application;

FIG. 12 is a diagram of another network device according to an embodiment of this application;

FIG. 13 is a diagram of a control device according to an embodiment of this application;

FIG. 14 is a diagram of another network device according to an embodiment of this application;

FIG. 15 is a diagram of another control device according to an embodiment of this application; and FIG. 16 is a diagram of a network device according to an embodiment of this application.

DESCRIPTION OF EMBODIMENTS

The following describes a method for forwarding a service packet, a method for sending an SR policy, a device, and a system provided in embodiments of this application in detail with reference to the accompanying drawings.

Figure 1:
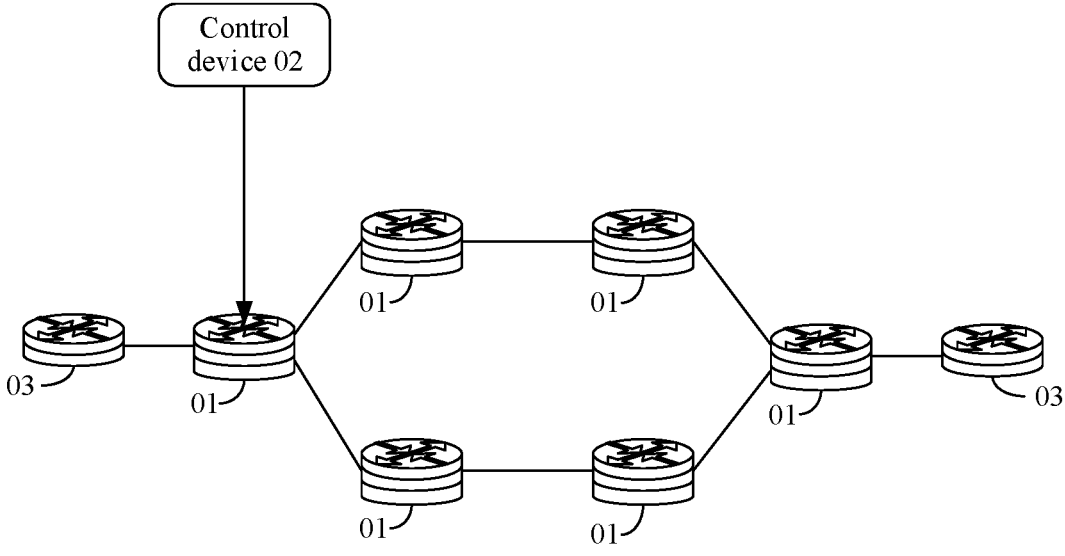
FIG. 1 is a diagram of an example system for forwarding a service packet according to an embodiment of this application.

FIG. 1 is a schematic diagram of a structure of a system for forwarding a service packet according to an embodiment of this application. As shown in FIG. 1, the system may include a plurality of network devices 01 and a control device 02. The control device 02 may establish a communication connection with at least one network device 01. The network device 01 may be a provider edge (PE) device or a provider (P) device, and the network device 01 may be a network device having a packet forwarding function, such as a router or a switch. The control device 02 may be a controller, a network control engine (NCE), or a path computation element server (PCE server). The controller and the NCE each may be a server, or a server cluster formed by several servers, or a cloud computing service center. The PCE server is an entity that can compute a network path or constraint route based on network topology information. The entity may be an application program, a network device, a server, a server cluster formed by several servers, or a cloud computing service center.

If the network device 01 is the PE device, as shown in FIG. 1, the PE device may further be connected to one or more customer edge (CE) devices 03. Each of the CE devices 03 may further be connected to one or more user terminals, that is, each of the CE devices 03 may be mounted with at least one user terminal. The user terminal may also be referred to as a host or user equipment, and the user terminal may be a device such as a computer, a wireless terminal device, or a virtual machine (VM) created over a server.

In embodiments of this application, in an optional implementation, the control device 02 may collect topology information of the plurality of network devices 01 and link state information of the plurality of network devices 01, and compute a path between a head-end network device and a tail-end network device in the plurality of network devices 01 based on a service requirement, to generate an SR policy. The link state information may include a segment identifier (SID) of each of the network devices 01, and the SID may be a label or an internet protocol (IP) address of the network device 01. The SR policy may include at least one candidate path between the head-end network device and the tail-end network device. Each candidate path may be identified by a segment list, and the segment list includes a SID of each network device 01 in the candidate path. In addition, the control device 02 may send the SR policy to the head-end network device through a BGP or a PCEP.

In another optional implementation, operation and maintenance personnel may further directly and manually configure the SR policy in the control device 02. Correspondingly, the control device 02 may send the SR policy to the head-end network device through a NETCONF.

In still another optional implementation, the head-end network device may collect traffic engineering (TE) information and interior gateway protocol (IGP) link state information of each network device through an IGP, and compute at least one candidate path that meets a condition between the head-end network device and the tail-end network device, to generate a corresponding SR policy.

In embodiments of this application, the system for forwarding a service packet may be further include at least one network slice, and each network slice may include a plurality of network devices 01. A physical outbound interface of each of the network devices 01 may be divided into a plurality of sub-interfaces, that is, one physical outbound interface is virtualized in a plurality of sub-interfaces, and each of the sub-interfaces may also be referred to as a logical interface. Each of the sub-interfaces corresponds to one network slice, and network slices corresponding to different sub-interfaces may be different or the same. In other words, a same network slice may correspond to a plurality of different sub-interfaces.

In some embodiments, the system for forwarding a service packet may be an internet protocol version 6 (IPv6) system, and the system may use an SRv6 forwarding technology. The SRv6 forwarding technology is a combination of IPv6 and an SR technology. Correspondingly, the SR policy may be an SRv6-based SR-TE Policy, or may be referred to as an SRv6-TE Policy.

Figure 2:
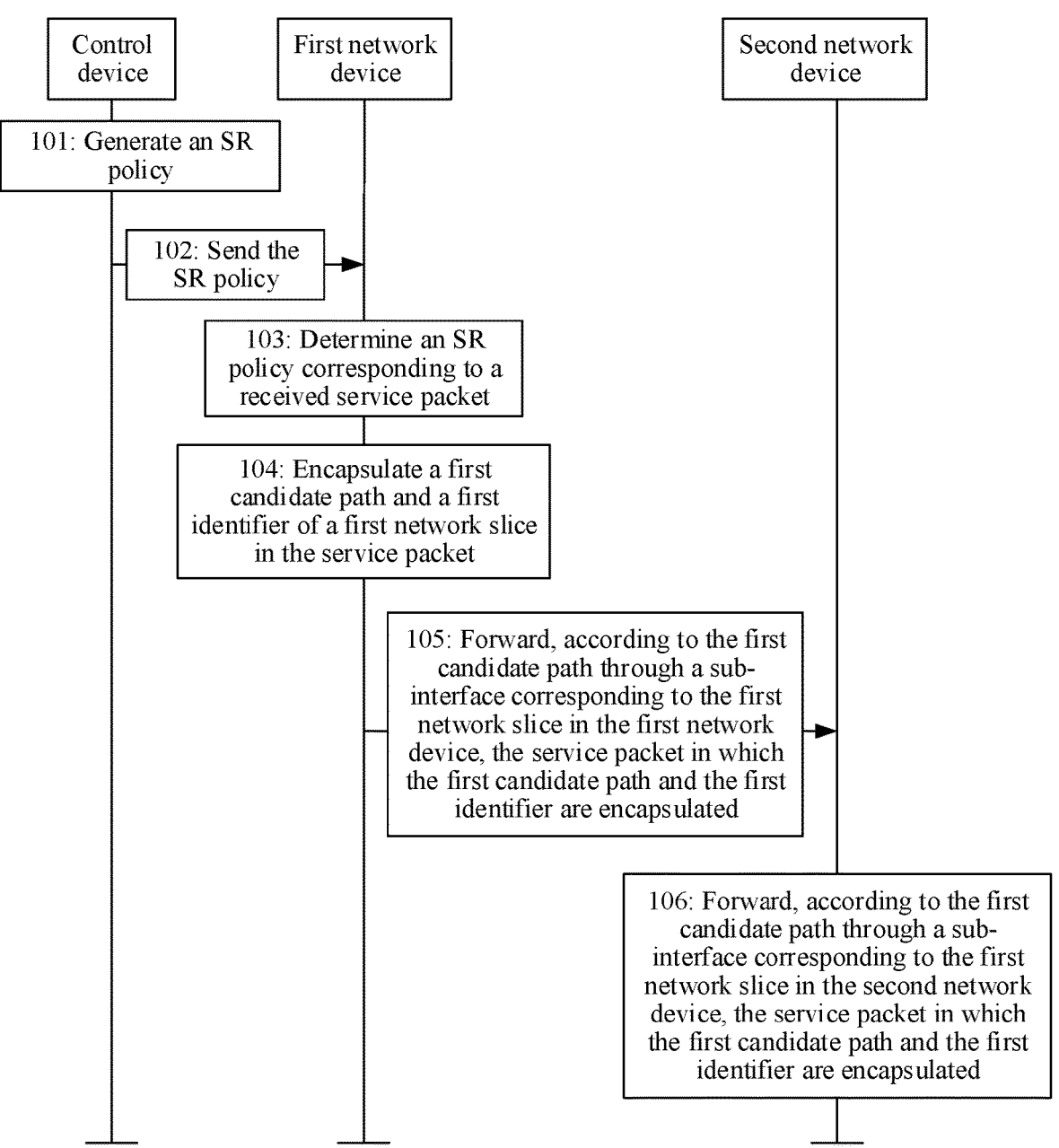
FIG. 2 is a flowchart of a method for forwarding a service packet according to an embodiment of this application.

FIG. 2 is a flowchart of a method for forwarding a service packet according to an embodiment of this application. The method may be used in the system for forwarding a service packet shown in FIG. 1. In embodiments of this application, an example in which a head-end network device of a candidate path in the system is a first network device, and an intermediate forwarding network device in the candidate path is a second network device is used for description. The intermediate forwarding network device is a network device other than the head-end network device and a tail-end network device in the candidate path. As shown in FIG. 2, the method may include the following operations.

Operation 101: A control device generates an SR policy.

In embodiments of this application, the control device may compute, based on collected topology information and link state information of each network device and a service requirement, a path between the head-end network device and the tail-end network device in a plurality of network devices, to determine a first candidate path that can meet the service requirement. In addition, the system for forwarding a service packet may be divided into at least one network slice based on the service requirement. The control device may determine that a first network slice in the at least one network slice corresponds to the first candidate path. For example, a service requirement met by the first network slice may be the same as the service requirement met by the first candidate path. In other words, the control device may map a network slice to a candidate path that meets a same service requirement as the network slice. Alternatively, both the first candidate path and the first network slice may be manually configured in the control device.

After obtaining the first candidate path and determining that the first candidate path corresponds to the first network slice, the control device may generate the SR policy. The SR policy includes the first candidate path and a first identifier of the first network slice corresponding to the first candidate path.

Operation 102: The control device sends the SR policy to the first network device.

The control device may send the SR policy to the first network device through a NETCONF, a BGP, or a PCEP.

Operation 103: The first network device determines an SR policy corresponding to a received service packet.

An SR policy received by the first network device may further include: a bind segment identifier (BSID), a color, and an endpoint. The BSID may be used for uniquely identifying the SR policy on the first network device. The endpoint identifier is used for indicating the tail-end network device. The color is used for distinguishing a plurality of different SR policies between the head-end network device and the tail-end network device, and the color may indicate performance of a tunnel path to the endpoint, for example, a low-latency tunnel or a low-cost tunnel.

After receiving the service packet, the first network device may determine the SR policy corresponding to the service packet. A process of determining the SR policy corresponding to the service packet may also be referred to as a process of diverting the service packet to the SR policy. In some embodiments, the first network device may determine the SR policy corresponding to the service packet according to a B SID diversion method, a color diversion method, or a differentiated services code point (DSCP) diversion method.

Operation 104: The first network device encapsulates the first candidate path and the first identifier of the first network slice in the service packet.

After determining the SR policy corresponding to the service packet, the first network device may obtain the first candidate path and the first identifier of the first network slice corresponding to the first candidate path from the SR policy. In addition, the first network device may encapsulate the first candidate path and the first identifier of the first network slice in the service packet. For example, the first network device may encapsulate the first candidate path in a packet header of the service packet, and encapsulate the first identifier of the first network slice in a payload of the service packet.

Operation 105: The first network device forwards, according to the first candidate path through a sub-interface corresponding to the first network slice in the first network device, the service packet in which the first candidate path and the first identifier are encapsulated to the second network device.

In embodiments of this application, the first network device may determine, based on the first identifier of the first network slice, the sub-interface corresponding to the first network slice from a plurality of sub-interfaces obtained by dividing a physical outbound interface of the first network device. Then, the first network device may forward, according to the first candidate path through the sub-interface corresponding to the first network slice, the service packet in which the first candidate path and the first identifier are encapsulated to a next-hop network device (that is, the second network device).

Operation 106: The second network device forwards, according to the first candidate path through a sub-interface corresponding to the first network slice in the second network device, the service packet in which the first candidate path and the first identifier are encapsulated.

After receiving the service packet, the second network device may obtain the first candidate path and the first identifier of the first network slice corresponding to the first candidate path from the service packet. Then, the second network device may determine, based on the first identifier of the first network slice, a sub-interface corresponding to the first network slice from a plurality of sub-interfaces obtained by dividing a physical outbound interface of the second network device, and may continue to forward the service packet to a next-hop network device through the sub-interface.

In embodiments of this application, in the first candidate path, a plurality of intermediate forwarding network devices, that is, a plurality of second network devices, may be included between the head-end network device and the tail-end network device. Therefore, after receiving the service packet in which the first candidate path and the first identifier of the first network slice corresponding to the first candidate path are encapsulated, each second network device may forward the service packet through the method shown in operation 106 until the service packet is forwarded to the tail-end network device.

In summary, embodiments of this application provide the method for forwarding a service packet and a method for sending an SR policy. A network device may forward a service packet according to a first candidate path in an SR policy through a sub-interface corresponding to a first network slice, and the first candidate path and a first identifier of a first network slice corresponding to the first candidate path are encapsulated in the service packet. In this way, it may be ensured that the network device that receives the service packet can also continue to forward the service packet according to the first candidate path through the sub-interface corresponding to the first network slice. In this way, a network slice technology and the SR policy are combined, which effectively improves flexibility of forwarding the service packet.

Figure 3:
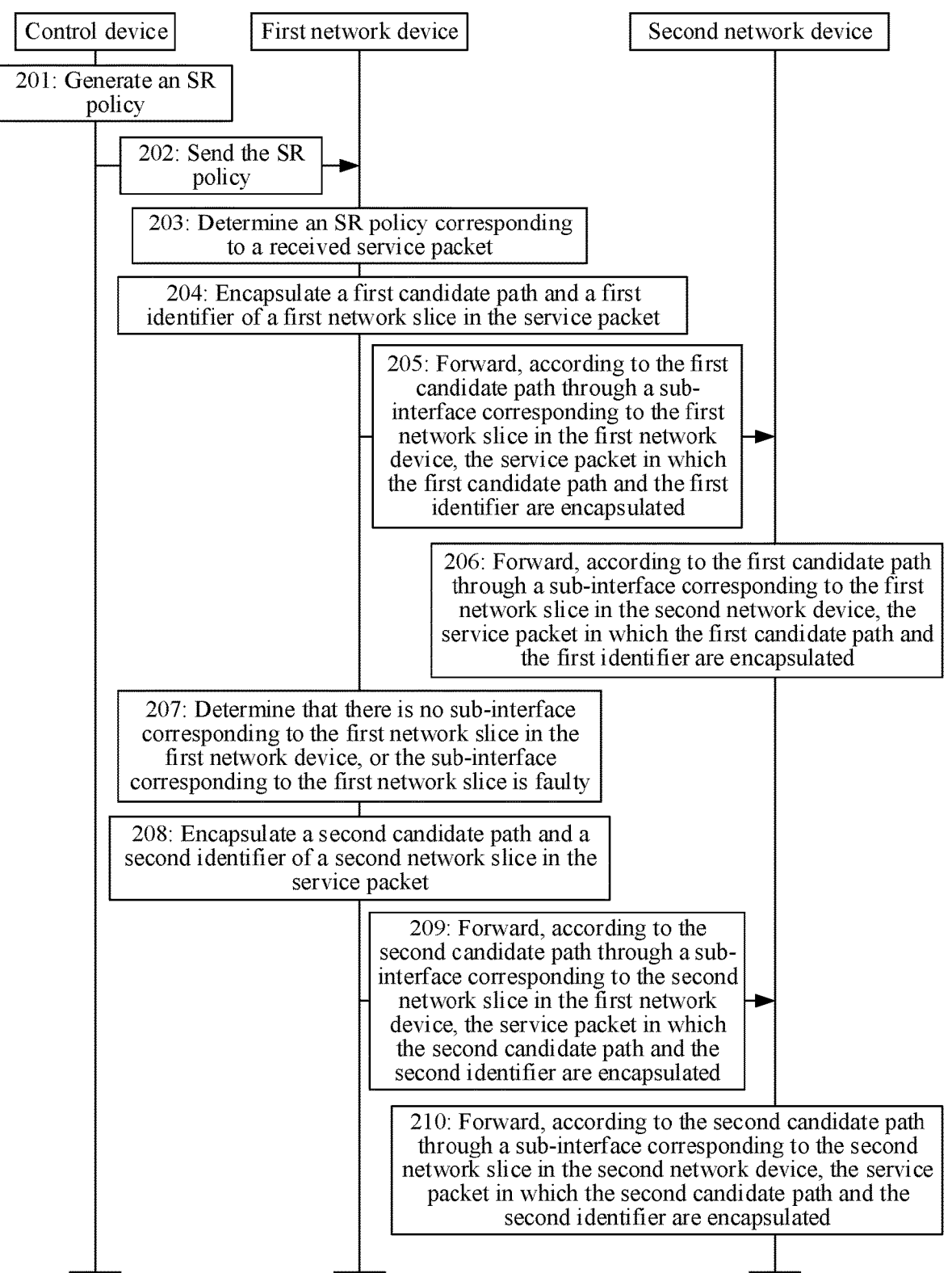
FIG. 3 is a flowchart of another method for forwarding a service packet according to an embodiment of this application.
Figure 4:
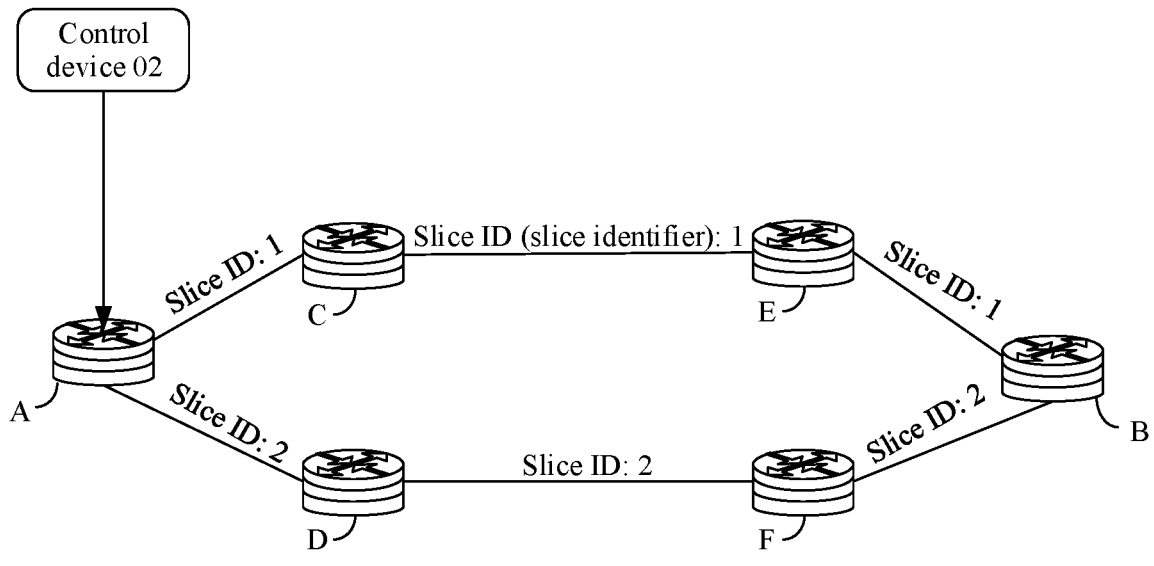
FIG. 4 is a diagram of another system for forwarding a service packet according to an embodiment of this application.

FIG. 3 is a flowchart of another method for forwarding a service packet according to an embodiment of this application. The method may be used in the system for forwarding a service packet shown in FIG. 1. In embodiments of this application, an example in which a head-end network device of a candidate path in the system is a first network device, and an intermediate forwarding network device in the candidate path is a second network device is used for description. The intermediate forwarding network device is a network device other than the head-end network device and a tail-end network device in the candidate path. For example, as shown in FIG. 4, a network device A is a head-end network device, a network device B is a tail-end network device, and a network device C to a network device F are all intermediate forwarding network devices. As shown in FIG. 3, the method may include the following operations.

Operation 201: A control device generates an SR policy.

In embodiments of this application, the system for forwarding a service packet may be divided into a plurality of network slices based on a service requirement, and the plurality of network slices include at least the first network slice and the second network slice. The SR policy may include a first candidate path, a first identifier of a first network slice corresponding to the first candidate path, a second candidate path, and a second identifier of a second network slice corresponding to the second candidate path.

In an optional implementation, the control device may generate the SR policy based on a parameter manually configured by operation and maintenance personnel. In other words, the SR policy may be statically configured in the control device through manual planning.

For example, the operation and maintenance personnel may add a node to a yang model of the SR policy, to describe an identifier of a network slice corresponding to each candidate path. As shown in FIG. 5, a yang model in a draft [draft-raza-spring-sr-policy-yang-03] is used as an example. A newly added node in the yang model: a slice identifier (slice-ID) is used for describing an identifier of a network slice corresponding to each candidate path.

In another optional implementation, the control device may establish a BGP connection with each network device in the system for forwarding a service packet, and collect topology information and link state information of each network device through a BGP link-state (BGP-LS). Then, the control device may compute, based on a service requirement, a path between a head-end network device and a tail-end network device in a plurality of network devices, to determine a plurality of candidate paths that can meet the service requirement. The plurality of candidate paths may include the first candidate path and the second candidate path.

In addition, the control device may determine that the first network slice in the at least one network slice corresponds to the first candidate path, and determine that the second network slice corresponds to the second candidate path. For example, a service requirement met by the first network slice may be the same as a service requirement met by the first candidate path, and a service requirement met by the second network slice may be the same as a service requirement met by the second candidate path. In other words, the control device may map a network slice to a candidate path that meets a same service requirement as the network slice.

In addition, in this implementation, the control device may support an extended BGP SR policy protocol, and an encoding structure of an SR policy in the extended BGP SR policy protocol may include a newly added node used for describing an identifier of a network slice corresponding to each candidate path. For example, a draft [draft-ietf-idr-segment-routing-te-policy-09 advertising segment routing policies in BGP] is extended, and an encoding structure of an SR policy in the extended protocol may be shown in FIG. 6. As shown in FIG. 6, the encoding structure of the SR policy in the extended protocol includes a newly added sub type length value (sub TLV) field, and the newly added sub-TLV field is used for carrying a slice ID of the network slice corresponding to each candidate path. The sub TLV field may be defined as shown in FIG. 7. As shown in FIG. 7, the sub TLV field may include: a type field whose length is 1 byte, a length field whose length is 1 byte, and a network slice identifier field whose length is 4 bytes. The network slice identifier field may be used for carrying an identifier of a network slice.

In still another optional implementation, the control device may be a PCE server, and the control device may be connected to the first network device through a PCEP. In this implementation, the control device may support an extended PCE SR policy protocol. For example, a draft [draft-barth-pce-segment-routing-policy-cp-06 PCEP extension to support Segment Routing Policy Candidate Paths] is extended. A sub-TLV field may be newly added to an SR policy association group (SRPAG) field in the extended protocol, and the newly added sub-TLV field is used for carrying an identifier of a network slice. For a format of the sub-TLV field, refer to FIG. 7.

For example, as shown in FIG. 4, it is assumed that the system for forwarding a service packet includes a network device A to a network device F. The network device A is a head-end network device, and the network device B is a tail-end network device. A control device 01 determines two candidate paths between the head-end network device A and the tail-end network device B. A first candidate path is: A→C→E→B, and a second candidate path is: A→D→F→B. In this case, an SR policy generated by the control device may be shown in FIG. 8. As shown in FIG. 8, the SR policy may include: a segment list 1 used for identifying a first candidate path, an identifier of a first network slice corresponding to the first candidate path: 1, a segment list 2 used for identifying a second candidate path, and an identifier of a first network slice corresponding to the second candidate path: 2. The segment list 1 includes SIDs of a network device C, a network device E, and a network device B, and the segment list 2 includes SIDs of a network device D, a network device F, and the network device B.

In a scenario in which the SR policy includes a plurality of candidate paths, the SR policy may further include a preference of each candidate path. For example, as shown in FIG. 8, in the SR policy, a preference of the first candidate path is 100, and a preference of the second candidate path is 50.

Operation 202: The control device sends the SR policy to the first network device.

After generating the SR policy, the control device may send the SR policy to the first network device. Correspondingly, the first network device may receive the SR policy sent by the control device.

In an optional implementation, if the SR policy is generated by the control device based on a parameter manually configured by operation and maintenance personnel, the control device may send the SR policy to the first network device through a NETCONF.

In another optional implementation, if the control device establishes a BGP connection with the first network device, and collects topology information and link state information of the network device through a BGP-LS, the control device may send the SR policy to the first network device through a BGP SR policy address family.

In still another optional implementation, if the control device is connected to the first network device through a PCEP, the control device may send the SR policy to the first network device through the PCEP.

For example, as shown in FIG. 4, a control device 02 may send the SR policy to the network device A.

Operation 203: The first network device determines an SR policy corresponding to a received service packet.

An SR policy received by the first network device may further include: a BSID, a color, and an endpoint. The endpoint is used for indicating the tail-end network device. The color is used for distinguishing a plurality of different SR policies between the head-end network device and the tail-end network device, and the color may indicate performance of a tunnel path to the endpoint, for example, a low-latency tunnel or a low-cost tunnel. For example, as shown in FIG. 8, the SR policy received by the first network device further includes a color: 123, an endpoint:2001:db8:: 1, and a BSID:1::b100. 2001:db8::1 is an IPv6 address of the tail-end network device B, and 1::b100 is an SID configured in the head-end network device.

After receiving the service packet, the first network device may determine the SR policy corresponding to the service packet. A process of determining the SR policy corresponding to the service packet may also be referred to as a process of diverting the service packet to the SR policy. In some embodiments, the first network device may determine the SR policy corresponding to the service packet according to a BSID diversion method, a color diversion method, or a DSCP diversion method.

For example, as shown in FIG. 4, after receiving the service packet, the network device A may search a virtual private networks (VPN) instance routing table, determine that a route outbound interface of the service packet is an SRv6 TE policy tunnel interface, and further determine the SR policy corresponding to the service packet.

Operation 204: The first network device encapsulates the first candidate path and the first identifier of the first network slice in the service packet.

After determining the SR policy corresponding to the service packet, the first network device may obtain the first candidate path and the first identifier of the first network slice corresponding to the first candidate path from the SR policy. In addition, the first network device may encapsulate the first candidate path and the first identifier of the first network slice in the service packet. In some embodiments, the first network device may encapsulate the first candidate path in a packet header of the service packet, and encapsulate the first identifier of the first network slice in a payload of the service packet.

For example, the first network device may encapsulate a hop-by-hop header in the payload of the service packet, and the hop-by-hop header carries the first identifier of the first network slice. In addition, if the service packet is an IPv6 packet, the first network device may encapsulate an SRH in the IPv6 packet, and the SRH may carry a segment list used for identifying the first candidate path.

It should be understood that, if the SR policy received by the first network device includes a plurality of candidate paths, the first network device may use a candidate path with a highest preference in the plurality of candidate paths as a candidate path used for forwarding the service packet, and encapsulate the candidate path with the highest preference in the packet header of the service packet. In other words, the first candidate path is the candidate path with the highest preference in the plurality of candidate paths.

For example, as shown in FIG. 8, in the SR policy, the preference 100 of the first candidate path is greater than the preference 50 of the second candidate path, so a network device A may encapsulate an SRH in the service packet, and the SRH carries a segment list 1 used for identifying the first candidate path. In addition, the network device may encapsulate a hop-by-hop header in the payload of the service packet, and the hop-by-hop header carries the identifier of the first network slice corresponding to the first candidate path: 1.

Operation 205: The first network device forwards, according to the first candidate path through a sub-interface corresponding to the first network slice in the first network device, the service packet in which the first candidate path and the first identifier are encapsulated to the second network device.

The first network device may determine, based on the first identifier of the first network slice, the sub-interface corresponding to the first network slice from a plurality of sub-interfaces obtained by dividing a physical outbound interface of the first network device. Then, the first network device may forward, according to the first candidate path through the sub-interface, the service packet in which the first candidate path and the first identifier are encapsulated to a next-hop network device (that is, the second network device).

For example, because the first candidate path is: A→C→E→B, the network device A may forward, according to the first candidate path through a sub-interface corresponding to a network slice whose identifier is 1, the service packet in which the first candidate path and the first identifier are encapsulated to a network device C.

In embodiments of this application, the first candidate path may be identified by one or more segment lists, and each of the segment lists may represent one forwarding path. In other words, the first candidate path may include one or more forwarding paths. In a scenario in which the first candidate path includes a plurality of forwarding paths, the first network slice may correspond to a plurality of sub-interfaces, each of the sub-interfaces corresponds to one forwarding path, and each of the segment lists further records a weight of one forwarding path represented by the segment list. The first network device may forward, based on weights of the plurality of forwarding paths, the service packet through the plurality of forwarding paths and the plurality of sub-interfaces corresponding to the first network slice by load sharing. A proportion of load shared by each of the forwarding paths is determined based on a weight of the forwarding path.

Operation 206: The second network device forwards, according to the first candidate path through a sub-interface corresponding to the first network slice in the second network device, the service packet in which the first candidate path and the first identifier are encapsulated.

After receiving the service packet, the second network device may obtain the first candidate path and the first identifier of the first network slice corresponding to the first candidate path from the service packet. The second network device may determine, based on the first identifier of the first network slice, the sub-interface corresponding to the first network slice from a plurality of sub-interfaces obtained by dividing a physical outbound interface of the second network device. Then, the second network device may continue to forward the service packet to a next-hop network device through the sub-interface according to the first candidate path. For an implementation process of operation 206, refer to the related descriptions in operation 205.

In embodiments of this application, in the first candidate path, a plurality of intermediate forwarding network devices, that is, a plurality of second network devices, may be included between the head-end network device and the tail-end network device. Therefore, after receiving the service packet in which the first candidate path and the first identifier of the first network slice corresponding to the first candidate path are encapsulated, each second network device may forward the service packet according to the method shown in operation 206 until the service packet is forwarded to the tail-end network device.

For example, refer to FIG. 4, after receiving the service packet in which the first candidate path and the first identifier are encapsulated sent by the network device A, the network device C may forward the service packet to a network device E according to the first candidate path: A→C→E→B through the sub-interface corresponding to the first network slice. Likewise, after receiving the service packet, the network device E may forward the service packet to the network device B according to the first candidate path: A→C→E→B through the sub-interface corresponding to the first network slice.

It should be understood that, after receiving the service packet, the second network device may further update a packet header of the service packet, and forward an updated service packet to a next-hop network device. For example, the second network device may pop up a top label of a label stack of the segment list, or modify a value of a segments left (SL) field in the SRH.

Operation 207: The first network device determines that there is no sub-interface corresponding to the first network slice in the first network device, or the sub-interface corresponding to the first network slice is faulty.

In embodiments of this application, before forwarding the service packet, the first network device may further detect whether there is the sub-interface corresponding to the first network slice in the first network device. If it is detected that there is the sub-interface corresponding to the first network slice in the first network device, it may be further detected whether the sub-interface corresponding to the first network slice can work normally. If the first network device determines that there is no sub-interface corresponding to the first network slice in the first network device, or the sub-interface corresponding to the first network slice is faulty, operation 208 may be performed.

In some embodiments, in embodiments of this application, the SR policy may further include attribute information of a network slice corresponding to each candidate path, and the attribute information may be used for indicating forced forwarding or non-forced forwarding. The forced forwarding means that the service packet is forcibly forwarded through the sub-interface corresponding to the network slice. The non-forced forwarding means that the service packet is not forcibly forwarded through the sub-interface corresponding to the network slice. That is, when the service packet cannot be forwarded through the sub-interface corresponding to the network slice, the service packet may be forwarded through a physical outbound interface. The physical outbound interface may correspond to a basic network slice, and the basic network slice may include all network devices in the system for forwarding a service packet.

For example, the SR policy sent by the control device includes a sub-sub-TLV field used for carrying an identifier of the network slice. The sub-sub-TLV field may be defined as shown in FIG. 9. As shown in FIG. 9, the sub-sub-TLV field may include: a type field whose length is 1 byte, a length field whose length is 1 byte, and an attribute information field whose length is 2 bytes. The attribute information field is used for carrying attribute information of the network slice. A length of the attribute information field may be adjusted based on a requirement.

Correspondingly, when detecting that there is no sub-interface corresponding to the first network slice in the first network device, or the sub-interface corresponding to the first network slice is faulty, the first network device may obtain attribute information of the first network slice from the SR policy. If the attribute information of the first network slice indicates forced forwarding, operation 208 may be performed.

If the attribute information of the first network slice indicates non-forced forwarding, the first network device may forward, according to the first candidate path through a physical outbound interface in the first network device, the service packet in which the first candidate path and the first identifier are encapsulated. It should be understood that, the first network device may include a plurality of physical outbound interfaces. When the attribute information of the first network slice indicates non-forced forwarding, the first network device may forward, through a physical outbound interface to which the sub-interface corresponding to the first network slice belongs, the service packet in which the first candidate path and the first identifier are encapsulated.

It should be further understood that, if the SR policy includes only one candidate path: the first candidate path, when the first network device detects that there is no sub-interface corresponding to the first network slice in the first network device, or the sub-interface corresponding to the first network slice is faulty, if the attribute information of the first network slice indicates forced forwarding, the first network device may discard the service packet. If the attribute information of the first network slice indicates non-forced forwarding, the first network device may forward, according to the first candidate path through a physical outbound interface in the first network device, the service packet in which the first candidate path and the first identifier are encapsulated.

Operation 208: The first network device encapsulates a second candidate path and a second identifier of a second network slice in the service packet.

If it is determined that there is no sub-interface corresponding to the first network slice in the first network device, or the sub-interface corresponding to the first network slice is faulty, the first network device may obtain the second candidate path other than the first candidate path and the second identifier of the second network slice corresponding to the second candidate path from the SR policy, and encapsulate the second candidate path and the second identifier of the second network slice corresponding to the second candidate path in the service packet.

Alternatively, if the SR policy further includes the attribute information of the first network slice, when determining that the attribute information of the first network slice indicates forced forwarding, the first network device may encapsulate the second candidate path and the second identifier of the second network slice corresponding to the second candidate path in the service packet.

It should be understood that, if a quantity of candidate paths included in the SR policy is greater than 2, the second candidate path may be a candidate path with a highest preference in the plurality of candidate paths other than the first candidate path. For related descriptions of encapsulating, by the second network device, the second candidate path and the second identifier of the second network slice in the service packet, refer to operation 204. Details are not described herein again.

For example, after determining that there is no sub-interface corresponding to the first network slice in the first network device, or the sub-interface corresponding to the first network slice is faulty, the network device A may encapsulate an SRH in the service packet. The SRH carries a segment list 2 used for identifying the second candidate path. In addition, the network device A may encapsulate a hop-by-hop header in the payload of the service packet, and the hop-by-hop header carries the identifier of the second network slice corresponding to the second candidate path: 2.

It should be understood that operation 207 may also be performed before operation 204. In other words, the first network device may first detect whether there is the sub-interface corresponding to the first network slice in the first network device, and whether the sub-interface is faulty. If there is the sub-interface corresponding to the first network slice and the sub-interface is not faulty, the first network device may perform operation 204. If there is no sub-interface corresponding to the first network slice in the first network device, or the sub-interface corresponding to the first network slice is faulty, the first network device may perform operation 208. If operation 207 is performed after operation 204, after determining that there is no sub-interface corresponding to the first network slice in the first network device, or the sub-interface corresponding to the first network slice is faulty, the first network device may re-encapsulate the service packet by performing operation 208.

Operation 209: The first network device forwards, according to the second candidate path through a sub-interface corresponding to the second network slice in the first network device, a service packet in which the second candidate path and the second identifier are encapsulated to the second network device.

The first network device may determine, based on the second identifier of the second network slice, the sub-interface corresponding to the second network slice from a plurality of sub-interfaces obtained by dividing a physical outbound interface of the first network device. Then, the first network device may forward, according to the second candidate path through the sub-interface corresponding to the second network slice, the service packet in which the second candidate path and the second identifier are encapsulated to a next-hop network device (that is, the second network device). An implementation process of operation 209 may be referred to the related descriptions in operation 205. Details are not described herein again.

For example, as shown in FIG. 4, it is assumed that the second candidate path is: A→D→F→B, the network device A may forward, according to the second candidate path through a sub-interface corresponding to a network slice whose identifier is 2, the service packet in which the second candidate path and the second identifier are encapsulated to a network device D.

It should be understood that, the SR policy may further include attribute information of the second network slice. Correspondingly, if the first network device detects that there is no sub-interface corresponding to the second network slice in the first network device, or the sub-interface corresponding to the second network slice is faulty, the first network device may obtain the attribute information of the second network slice. If the attribute information of the second network slice indicates forced forwarding, and the SR policy further includes another candidate path other than the first candidate path and the second candidate path, the first network device may forward the service packet through the another candidate path with reference to the methods shown in operation 208 and operation 209. If the SR policy does not include another candidate path, the first network device may discard the service packet. If the attribute information of the second network slice indicates non-forced forwarding, the first network device may forward, according to the second candidate path through a physical outbound interface in the first network device, the service packet in which the second candidate path and the second identifier are encapsulated.

Operation 210: The second network device forwards, according to the second candidate path through a sub-interface corresponding to the second network slice in the second network device, the service packet in which the second candidate path and the second identifier are encapsulated.

After receiving the service packet, the second network device may obtain the second candidate path and the second identifier of the second network slice corresponding to the second candidate path from the service packet. The second network device may determine, based on the second identifier of the second network slice, the sub-interface corresponding to the second network slice from a plurality of interfaces obtained by dividing a physical outbound interface of the second network device. Then, the second network device may forward the service packet to a next-hop network device according to the second candidate path through the sub-interface. For an implementation process of operation 210, refer to the related descriptions in operation 205 and operation 206.

For example, refer FIG. 4, after receiving the service packet in which the second candidate path and the second identifier are encapsulated sent by the network device A, the network device D may forward the service packet to a network device F according to the second candidate path: A→D→F→B through the sub-interface corresponding to the second network slice. Likewise, the network device F forwards the service packet to the network device B according to the second candidate path: A→D→F→B through the sub-interface corresponding to the second network slice.

In some embodiments, a sequence of operations of the method for forwarding a service packet provided in embodiments of this application may be properly adjusted, and the operations may be correspondingly added or deleted in some situations. For example, operation 101 and operation 102, and operation 201 and operation 202 may be skipped in some situations. That is, the first network device may directly obtain a pre-configured SR policy, and the control device does not need to generate and send the SR policy. For example, operation and maintenance personnel may directly configure the SR policy in the first network device. Alternatively, operation 207 to operation 210 may be skipped in some situations. Alternatively, operation 207 may also be performed before operation 204. Any variation method readily figured out by a person skilled in the art within the technical scope disclosed in this application shall fall within the protection scope of this application. Therefore, details are not described herein.

In summary, embodiments of this application provide a method for forwarding a service packet and a method for sending an SR policy. A network device may forward a service packet according to a first candidate path in an SR policy through a sub-interface corresponding to a first network slice, and the first candidate path and a first identifier of a first network slice corresponding to the first candidate path are encapsulated in the service packet. In this way, it may be ensured that the network device that receives the service packet can also continue to forward the service packet according to the first candidate path through the sub-interface corresponding to the first network slice. In this way, a network slice technology and the SR policy are combined, which effectively improves flexibility of forwarding the service packet.

In addition, in the related technology, after a network supporting an SR policy is sliced, when a service packet is forwarded in a network slice, a forwarding path is generally designed according to an SR-BE technology. When the forwarding path determined according to the SR-BE technology is faulty, forwarding needs to be performed through a physical outbound interface, which cannot meet an SLA requirement of a service. However, in embodiments of this application, after determining that there is no sub-interface corresponding to the first network slice in the first network device, or the sub-interface corresponding to the first network slice is faulty, the first network device may forward the service packet according to the second candidate path in the SR policy through the sub-interface corresponding to the second network slice. The second network slice and the first network slice may be divided based on a same service requirement. Therefore, the SLA requirement of the service may still be met.

FIG. 10 is a schematic diagram of a structure of a network device according to an embodiment of this application. The network device is applicable to the system for forwarding a service packet shown in FIG. 1 or FIG. 4. For example, the network device may be a head-end network device of a candidate path in an SR policy. As shown in FIG. 10, the network device may include:

a first determining module 301, configured to determine an SR policy corresponding to a received service packet, where the SR policy includes a first candidate path and a first identifier of a first network slice corresponding to the first candidate path, the network device is a head-end network device of the first candidate path, and a function implementation of the first determining module 301 may be referred to the related descriptions in operation 103 or operation 203;

an encapsulating module 302, configured to encapsulate the first candidate path and the first identifier of the first network slice in the service packet, where a function implementation of the encapsulating module 302 may be referred to the related descriptions in operation 104 or operation 204; and a forwarding module 303, configured to forward, according to the first candidate path through a sub-interface corresponding to the first network slice in the network device, the service packet in which the first candidate path and the first identifier are encapsulated, where the sub-interface is obtained by dividing a physical outbound interface of the network device, and a function implementation of the forwarding module 303 may be referred to the related descriptions in operation 105 or operation 205.

In some embodiments, the SR policy may further include a second candidate path and a second identifier of a second network slice corresponding to the second candidate path, and a preference of the first candidate path is higher than a preference of the second candidate path. As shown in FIG. 11, the network device may further include:

a second determining module 304, configured to determine, after the first determining module 301 determines the SR policy corresponding to the received service packet, that there is no interface corresponding to the first identifier in the network device, or the interface corresponding to the first identifier is faulty, where a function implementation of the second determining module 304 may be referred to the related descriptions in operation 207.

The encapsulating module 302 is further configured to encapsulate the second candidate path and the second identifier of the second network slice corresponding to the second candidate path in the service packet, where a function implementation of the encapsulating module 302 may further be referred to the related descriptions in operation 208.

The forwarding module 303 is further configured to forward, according to the second candidate path through a sub-interface corresponding to the second network slice in the network device, the service packet in which the second candidate path and the second identifier are encapsulated, where a function implementation of the forwarding module 303 may further be referred to the related descriptions in operation 209.

In some embodiments, the SR policy further includes: attribute information of the first network slice. The encapsulating module 302 is configured to encapsulate, if the attribute information indicates forced forwarding, the second candidate path and the second identifier of the second network slice corresponding to the second candidate path in the service packet.

The forwarding module 303 is further configured to: if the attribute information indicates non-forced forwarding, forward, according to the first candidate path through the physical outbound interface of the network device, the service packet in which the first candidate path and the first identifier are encapsulated.

In some embodiments, as shown in FIG. 11, the network device may further include:

a receiving module 305, configured to receive, before the first determining module 301 determines the SR policy corresponding to the received service packet, the SR policy sent by a control device. A function implementation of the receiving module 305 may be referred to the related descriptions in operation 102 or operation 202.

In some embodiments, the receiving module 305 may be configured to: receive the SR policy sent by the control device through a NETCONF; or receive the SR policy sent by the control device through a BGP; or receive the SR policy sent by the control device through a PCEP.

In some embodiments, the encapsulating module 302 may be configured to: encapsulate the first candidate path in a packet header of the service packet; and encapsulate the first identifier in a payload of the service packet.

In summary, embodiments of this application provide a network device. The network device may forward a service packet according to a first candidate path in an SR policy through a sub-interface corresponding to a first network slice, and the first candidate path and a first identifier of a first network slice corresponding to the first candidate path are encapsulated in the service packet. In this way, it may be ensured that the network device that receives the service packet can also continue to forward the service packet according to the first candidate path through the sub-interface corresponding to the first network slice. In this way, a network slice technology and the SR policy are combined, which effectively improves flexibility of forwarding the service packet.

FIG. 12 is a schematic diagram of a structure of another network device according to an embodiment of this application. The network device is applicable to the system for forwarding a service packet shown in FIG. 1 or FIG. 4. For example, the network device may be an intermediate forwarding network device other than a head-end network device and a tail-end network device in a candidate path in an SR policy. As shown in FIG. 12, the network device may include:

a receiving module 401, configured to receive a service packet, where a first candidate path and a first identifier of a first network slice corresponding to the first candidate path are encapsulated in the service packet, the network device is a network device other than a head-end network device and a tail-end network device in the first candidate path, and a function implementation of the receiving module 401 may be referred to the related descriptions in operation 105 or operation 205; and a forwarding module 402, configured to forward, according to the first candidate path through a sub-interface corresponding to the first network slice in the network device, the service packet in which the first candidate path and the first identifier are encapsulated, where the sub-interface is obtained by dividing a physical outbound interface of the network device, and a function implementation of the forwarding module 402 may be referred to the related descriptions in operation 106 or operation 206.

In summary, embodiments of this application provide a network device. Because a first candidate path and a first identifier of a first network slice corresponding to the first candidate path are encapsulated in a service packet received by the network device, the network device may forward the service packet according to the first candidate path through a sub-interface corresponding to the first network slice. In this way, a network slice technology and the SR policy are combined, which effectively improves flexibility of forwarding the service packet.

FIG. 13 is a schematic diagram of a structure of a control device according to an embodiment of this application. The control device is applicable to the system for forwarding a service packet shown in FIG. 1 or FIG. 4. For example, the control device may be a controller, an NCE, or a PCE server. As shown in FIG. 13, the control device may include:

a generation module 501, configured to generate a segment routing SR policy, where the SR policy includes a first candidate path and a first identifier of a first network slice corresponding to the first candidate path, and a function implementation of the generation module 501 may be referred to the related descriptions in operation 101 or operation 201; and a sending module 502, configured to send the SR policy to a network device, where the network device is a head-end network device of the first candidate path, the SR policy indicates the network device to encapsulate the first candidate path and the first identifier in a service packet corresponding to the SR policy, and a function implementation of the sending module 502 may be referred to the related descriptions in operation 102 or operation 202.

In some embodiments, the SR policy further includes: a second candidate path, a second identifier of a second network slice corresponding to the second candidate path, a preference of the first candidate path, and a preference of the second candidate path.

In some embodiments, the sending module 502 may be configured to: send the SR policy to the network device through a NETCONF; or send the SR policy to the network device through a BGP; or send the SR policy to the network device through a PCEP.

In summary, embodiments of this application provide a control device. An SR policy sent by the control device to a network device may include a first candidate path, and a first identifier of a first network slice corresponding to the first candidate path. In this way, it may be ensured that the network device can forward a service packet according to the first candidate path in the SR policy through a sub-interface corresponding to the first network slice. According to the solutions provided in embodiments of this application, a network slice technology and the SR policy are combined, which effectively improves flexibility of forwarding the service packet.

It may be clearly understood by a person skilled in the art that, for the purpose of convenient and brief description, a detailed working process of the foregoing network device, control device, and modules may all be referred to a corresponding process in the foregoing method embodiments, and details are not repeated herein again.

It should be understood that, the network device and the control device provided in embodiments of this application may further be implemented by an application-specific integrated circuit (ASIC), or a programmable logic device (PLD). The PLD may be a complex programmable logical device (CPLD), a field-programmable gate array (FPGA), a generic array logic (GAL), or any combination thereof. Alternatively, the method for forwarding a service packet and the method for sending an SR policy provided in the foregoing method embodiments may be implemented through software. When the method for forwarding a service packet provided in the foregoing method embodiments is implemented through the software, each module in the network device may also be a software module. When the method for sending an SR policy provided in the foregoing method embodiments is implemented through the software, each module in the control device may also be a software module.

FIG. 14 is a schematic diagram of a structure of a network device according to an embodiment of this application. The network device is applicable to a system for forwarding a service packet. For example, the network device may be a first network device (that is, a head-end network device in a candidate path) in the system for forwarding a service packet, or may be a second network device (that is, an intermediate forwarding network device in a candidate path) in the system for forwarding a service packet. That is, the network device is applicable to the system for forwarding a service packet shown in FIG. 1 or FIG. 4. For example, the network device may be a network device A shown in FIG. 4, or may be any one of network devices from a network device C to a network device F shown in FIG. 4.

Referring to FIG. 14, the network device may include: a processor 1401, a memory 1402, a network interface 1403, and a bus 1404. The bus 1404 is configured to connect the processor 1401, the memory 1402, and the network interface 1403. A communication connection with another device may be implemented through the network interface 1403 (which may be wired or wireless). The memory 1402 stores a computer program, and the computer program is for implementing various application functions. When modules in the network device shown in any one of FIG. 10 to FIG. 12 are implemented through software modules, programs corresponding to the software modules may be stored in the memory 1402 of the network device.

It should be understood that, in embodiments of this application, the processor 1401 may be a CPU, or the processor 1401 may be another general-purpose processor, a digital signal processor (DSP), an ASIC, a FPGA, GPU or another programmable logic device, a discrete gate or a transistor logic device, a discrete hardware component, or the like. The general-purpose processor may be a microprocessor, any conventional processor, or the like.

The memory 1402 may be a volatile memory or a non-volatile memory, or may include both a volatile memory and a non-volatile memory. The nonvolatile memory may be a read-only memory (read-only memory, ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The bus 1404 may further include a power bus, a control bus, a state signal bus, and the like, in addition to a data bus. However, for the purpose of clear descriptions, various buses are all marked as the bus 1404 in the figure.

If the network device is the first network device in the foregoing embodiments, in an embodiment, a processor 1401 in the network device is configured to: determine a segment routing SR policy corresponding to a received service packet, where the SR policy includes a first candidate path and a first identifier of a first network slice corresponding to the first candidate path, and the network device is a head-end network device of the first candidate path; encapsulate the first candidate path and the first identifier of the first network slice in the service packet; and forward, according to the first candidate path through a sub-interface corresponding to the first network slice in the network device, the service packet in which the first candidate path and the first identifier are encapsulated, where the sub-interface is obtained by dividing a physical outbound interface of the network device. For a detailed processing process of the processor 1401, refer to the foregoing method embodiments. For example, reference may be made to detailed descriptions of operation 103 to operation 105 in the embodiments shown in FIG. 2, and operation 203 to operation 205, and operation 207 to operation 209 in the embodiments shown in FIG. 3. Details are not described herein again.

If the network device is the second network device in the foregoing embodiments, in an embodiment, a processor 1401 in the network device is configured to: receive a service packet, where a first candidate path and a first identifier of a first network slice corresponding to the first candidate path are encapsulated in the service packet, and the network device is a network device other than a head-end network device and a tail-end network device in the first candidate path; and forward, according to the first candidate path through a sub-interface corresponding to the first network slice in the network device, the service packet in which the first candidate path and the first identifier are encapsulated, where the sub-interface is obtained by dividing a physical outbound interface of the network device. For a detailed processing process of the processor 1401, refer to the foregoing method embodiments. For example, reference may be made to detailed descriptions of operation 105 and operation 106 in the embodiments shown in FIG. 2, and operation 205 and operation 206, and operation 209 and operation 210 in the embodiments shown in FIG. 3. Details are not described herein again.

FIG. 15 is a schematic diagram of a structure of a control device according to an embodiment of this application. The control device is applicable to a system for forwarding a service packet. For example, the control device may be a controller, an NCE, or a PCE server.

Referring to FIG. 15, the control device may include: a processor 1501, a memory 1502, a network interface 1503, and a bus 1504. The bus 1504 is configured to connect the processor 1501, the memory 1502, and the network interface 1503. A communication connection with another device may be implemented through the network interface 1503 (which may be wired or wireless). The memory 1502 stores a computer program, and the computer program is for implementing various application functions. When modules in the control device shown in FIG. 13 are implemented through software modules, programs corresponding to the software modules may be stored in the memory 1502 of the control device.

It should be understood that, in embodiments of this application, the processor 1501 may be a CPU, or the processor 1501 may be another general-purpose processor, a DSP, an ASIC, a FPGA, GPU or another programmable logic device, a discrete gate or a transistor logic device, a discrete hardware component, or the like. The general-purpose processor may be a microprocessor, any conventional processor, or the like.

The memory 1502 may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of RAMs may be used, for example, a static random access memory (SRAM), a DRAM, a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The bus 1504 may further include a power bus, a control bus, a state signal bus, and the like, in addition to a data bus. However, for clear description, various buses are all marked as the bus 1504 in the figure.

In an embodiment, the processor 1501 in the control device is configured to: generate an SR policy, where the SR policy includes a first candidate path and a first identifier of a first network slice corresponding to the first candidate path; and send the SR policy to a network device, where the network device is a head-end network device of the first candidate path, and the SR policy indicates to encapsulate the first candidate path and the first identifier in a service packet corresponding to the SR policy. For a detailed processing process of the processor 1501, refer to the foregoing method embodiments. For example, reference may be made to detailed descriptions of operation 101 and operation 102 in the embodiments shown in FIG. 2, and operation 201 and operation 202 in the embodiments shown in FIG. 3. Details are not described herein again.

FIG. 16 is a schematic diagram of a structure of a network device according to an embodiment of this application. The network device is applicable to a system for forwarding a service packet. For example, the network device may be a first network device (that is, a head-end network device in a candidate path) in the system for forwarding a service packet, or may be a second network device (that is, an intermediate forwarding network device in a candidate path) in the system for forwarding a service packet. That is, the network device is applicable to the system for forwarding a service packet shown in FIG. 1 or FIG. 4. For example, the network device may be a network device A shown in FIG. 4, or may be any one of network devices from a network device C to a network device F shown in FIG. 4.

As shown in FIG. 16, the network device may include: a main control board 1601 and at least one interface board (the interface board is also referred to as a line card or a service board). For example, FIG. 16 shows an interface board 1602 and an interface board 1603. When there is a plurality of interface boards, a switching board 1604 may be included. The switching board 1604 is configured to complete data exchange between the interface boards.

The main control board 1601 is configured to complete functions such as system management, device maintenance, and protocol processing. The interface board 1602 and the interface board 1603 are configured to provide various service interfaces (for example, a POS interface, a GE interface, and an ATM interface), and implement packet forwarding. The main control board 1601 mainly includes three types of functional units: a system management and control unit, a system clock unit, and a system maintenance unit. The main control board 1601, the interface board 1602, and the interface board 1603 are connected to a system backplane through a system bus to implement intercommunication. The interface board 1602 includes one or more central processing units 16021. The central processing unit 16021 is configured to control and manage the interface board 1602, communicate with a central processing unit 16011 on the main control board 1601, and forward a packet. A forwarding entry memory 16024 on the interface board 1602 is configured to store a forwarding entry, and the central processing unit 16021 may forward a packet by searching for the forwarding entry stored in the forwarding entry memory 16024.

The interface board 1602 includes one or more physical interface cards 16023. The physical interface card 16023 is configured to receive a packet sent by a previous-hop node, and send a processed packet to a next-hop node based on an instruction of the central processing unit 16021. A specific implementation process is not described herein again. A specific function of the central processing unit 16021 is not described herein again.

It may be understood that, a forwarding module and a receiving module in the network device may be located in the interface board 1602, and an encapsulating module and each determining module may be located in the main control board 1601.

It may also be understood that, as shown in FIG. 16, this embodiment includes a plurality of interface boards, and uses a distributed forwarding mechanism. In this mechanism, a structure of the interface board 1603 is basically the same as a structure of the interface board 1602, and an operation on the interface board 1603 is basically similar to an operation on the interface board 1602. For brevity, details are not described herein again. In addition, it may be understood that, the central processing unit 16021 and/or a network processor 16022 in the interface board 1602 in FIG. 16 may be dedicated hardware or a chip, for example, a dedicated integrated circuit may be used to implement the foregoing functions. This implementation is generally a method through which a forwarding plane uses dedicated hardware or a chip for processing. In another implementation, the central processing unit 16021 and/or the network processor 16022 may also use a general-purpose processor, such as a general-purpose CPU, to implement the functions described above.

In addition, it should be understood that, there may be one or more main control boards 1601. When there are a plurality of main control boards 1601, a primary main control board and a secondary main control board may be included. There may be one or more interface boards, and a device having a stronger data processing capability provides more interface boards. If there are a plurality of interface boards, the plurality of interface boards can communicate with each other by using one or more switching boards, and the plurality of interface boards can jointly implement load balancing and redundancy backup. In a centralized forwarding architecture, the device may not need the switching board, and the interface board provides a function of processing service data of an entire system. In a distributed forwarding architecture, the device includes the plurality of interface boards. Data exchange between the plurality of interface boards may be implemented by using the switching board, to provide a large-capacity data exchange and processing capability. Therefore, a data access and processing capability of a network device in the distributed architecture is better than that of a device in the centralized architecture.

An architecture that is to be used depends on a networking deployment scenario. This is not limited herein.

In a specific embodiment, a memory 16012 and a memory 16024 may be read-only memories (ROM), other types of static storage devices that can store static information and instructions, random access memories (RAM), or other types of dynamic storage devices that can store information and instructions, or may be electrically erasable programmable read-only memories (EEPROM), compact disc read-only memories (CD-ROM) or other compact disc storages, optical disc storages (including a compact disc, a laser disc, an optical disc, a digital versatile disc, a Blu-ray disc, or the like), magnetic disks or other magnetic storage devices, or any other medium that can be used to carry or store expected program code in a form of instructions or a data structure and that can be accessed by a computer. However, the memory 16012 and the memory 16024 are not limited thereto. The memory 16024 in the interface board 1602 may exist independently, and is connected to the central processing unit 16021 through a communication bus; or the memory 16024 may be integrated with the central processing unit 16021. The memory 16012 in the main control board 1601 may exist independently, and is connected to the central processing unit 16011 through a communication bus; or the memory 16012 may be integrated with the central processing unit 16011.

The memory 16024 is configured to store program code, and is controlled to execute by the central processing unit 16021. The memory 16012 is configured to store program code, and is controlled to execute by the central processing unit 16011. The central processing unit 16021 and/or the central processing unit 16011 may execute program code to implement a method provided in the foregoing method embodiments. The program code stored in the memory 16024 and/or the memory 16012 may include one or more software modules. The one or more software modules may be functional modules provided in the embodiments shown in any one of FIG. 10 to FIG. 12.

In an embodiment, the physical interface card 16023 may be an apparatus that uses any transceiver, and is configured to communicate with another device or a communication network, for example, an Ethernet, a radio access network (RAN), or a wireless local area network (WLAN).

An embodiment of this application further provides a computer-readable storage medium. The computer-readable storage medium stores instructions. When the instructions are run on a computer, the computer is enabled to perform the method for forwarding a service packet or the method for sending an SR policy provided in the foregoing method embodiments.

An embodiment of this application further provides a computer program product. When the computer program product is run on a computer, the computer is enabled to perform the method for forwarding a service packet or the method for sending an SR policy provided in the foregoing method embodiments.

An embodiment of this application further provides a system for forwarding a service packet. As shown in FIG. 1 and FIG. 4, the system may include a plurality of network devices 01, and a control device 02. The plurality of network devices 01 may include the network device shown in FIG. 10, FIG. 11, FIG. 14, or FIG. 16, and the network device shown in FIG. 12, FIG. 14, or FIG. 16. The control device 02 may be the control device shown in FIG. 13 or FIG. 15.

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid state drive (SSD).

In this application, the terms "first", "second", and the like are used to distinguish between same or similar items whose effects and functions are basically the same. It should be understood that there is no logical or time-sequence dependency between "first", "second", and "n$^{th}$", and a quantity and an execution sequence are not limited. It should also be understood that although terms such as "first" and "second" are used in the following description to describe various elements, these elements should not be limited by the terms. These terms are merely used to distinguish one element from another element. For example, without departing from the scope of various examples, a first network device may be referred to as a second network device. Similarly, a second network device may be referred to as a first network device.

The term "at least one" in this application means one or more, and the term "a plurality of" in this application means two or more. For example, a plurality of sub-interfaces means two or more sub-interfaces. The terms "system" and "network" may be used interchangeably in this specification.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A network device for a head-end network device, the network device comprising:

at least one processor;

one or more memories coupled to the at least one processor and storing executable instructions therein, which when executed by the at least one processor cause the network device to:

receive a segment routing (SR) policy sent by a control device, wherein the SR policy comprises a first candidate path and a first identifier of a first network slice corresponding to the first candidate path, and the first candidate path comprises the head-end network device, an intermediate forwarding network device and a tail-end network device;

determine that the SR policy corresponds to a received service packet;

encapsulate the first candidate path and the first identifier of the first network slice in the received service packet; and forward the received service packet in which the first candidate path and the first identifier are encapsulated according to the first candidate path.

2. The network device according to claim 1, wherein the network device is further caused to:

receive the SR policy sent by the control device through a network configuration protocol (NETCONF);

receive the SR policy sent by the control device through a border gateway protocol (BGP); or receive the SR policy sent by the control device through a path computation element communication protocol (PCEP).

3. The network device according to claim 1, wherein the network device is further caused to:

encapsulate the first candidate path in a packet header of the received service packet; and encapsulate the first identifier in the packet header of the received service packet.

4. A network device for an intermediate forwarding network device, the network device comprising:

at least one processor;

one or more memories coupled to the at least one processor and storing executable instructions therein, which when executed by the at least one processor cause the network device to:

receive a service packet, wherein a first candidate path and a first identifier of a first network slice corresponding to the first candidate path are encapsulated in the service packet, and the first candidate path comprises a head-end network device, the intermediate forwarding network device and a tail-end network device; and forward the service packet in which the first candidate path and the first identifier are encapsulated according to the first candidate path through a sub-interface corresponding to the first network slice in the intermediate forwarding network device.

5. A system for forwarding a service packet, the system comprising:

a first network device and a second network device, wherein the first network device is applied to a head-end network device of a first candidate path, and the first network device is applied to an intermediate forwarding network device of the first candidate path;

wherein the first network device is configured to:

receive a segment routing (SR) policy sent by a control device, wherein the SR policy comprises the first candidate path and a first identifier of a first network slice corresponding to the first candidate path, and the first candidate path comprises the head-end network device, the intermediate forwarding network device and a tail-end network device;

determine that the SR policy corresponds to a service packet;

encapsulate the first candidate path and the first identifier of the first network slice in the service packet; and forward the service packet to the second network device according to the first candidate path, wherein the first candidate path and the first identifier are encapsulated in the service packet;

wherein the second network device is configured to:

receive the service packet from the first network device; and forward the service packet according to the first candidate path through a sub-interface corresponding to the first network slice in the second network device.

6. The system according to claim 5, wherein the first network device is further configured to:

receive the SR policy sent by the control device through a network configuration protocol (NETCONF);

receive the SR policy sent by the control device through a border gateway protocol (BGP); or receive the SR policy sent by the control device through a path computation element communication protocol (PCEP).

7. The system according to claim 5, wherein the first network device is further configured to:

encapsulate the first candidate path in a packet header of the service packet; and encapsulate the first identifier in the packet header of the service packet.

8. The network device according to claim 1, wherein the first network slice is related to a plurality of network devices comprising the head-end network device, the intermediate forwarding network device and the tail-end network device.

9. The network device according to claim 1, wherein the network device is further caused to:

forward the received service packet in which the first candidate path and the first identifier are encapsulated according to the first candidate path, and through a sub-interface corresponding to the first network slice in the head-end network device.

10. The network device according to claim 4, wherein the first network slice is related to a plurality of network devices comprising the head-end network device, the intermediate forwarding network device and the tail-end network device.

11. The system according to claim 5, wherein the first network slice is related to a plurality of network devices comprising the head-end network device, the intermediate forwarding network device and the tail-end network device.

12. The system according to claim 5, wherein the first network device is further configured to:

forward the service packet in which the first candidate path and the first identifier are encapsulated according to the first candidate path through a sub-interface corresponding to the first network slice in the head-end network device.

* * * * *